United States Patent [19]
Chu et al.

[11] Patent Number: 5,680,626
[45] Date of Patent: Oct. 21, 1997

[54] METHOD AND APPARATUS FOR PROVIDING ONLY THAT NUMBER OF CLOCK PULSES NECESSARY TO COMPLETE A TASK

[75] Inventors: Michael C. K. Chu, Kolwoon; Hing Leung Yiu, Tsuen Wan, both of Hong Kong

[73] Assignee: Motorola, Inc., Schaumburg, Ill.

[21] Appl. No.: 444,347

[22] Filed: May 18, 1995

[51] Int. Cl.⁶ .................................................. G06F 1/32
[52] U.S. Cl. .................................. 395/750; 395/555
[58] Field of Search .............................. 395/750, 555; 364/707

[56] References Cited

U.S. PATENT DOCUMENTS 5,222,239 6/1993 Rosch ................................. 395/750
5,493,684 2/1996 Gephardt et al. .................... 395/750
5,495,617 2/1996 Yamada ............................... 395/750

Primary Examiner—Jack B. Harvey
Assistant Examiner—Jeffrey K. Seto
Attorney, Agent, or Firm—Craig J. Yudell

[57] ABSTRACT

In a portable electronic device, a method and apparatus for providing a predetermined portion of a limited resource from a programmable resource allocators (PRAs) (240) to a processor (22) to execute a task (210) optimally. The processor (22) programming the PRA with a resource utilization input (RUI) (250) prior to executing the task (210). The RUI (250) stored in a task descriptor (220), and the task descriptor (220) and the task (210) stored in the memory (200).

16 Claims, 4 Drawing Sheets

METHOD AND APPARATUS FOR PROVIDING ONLY THAT NUMBER OF CLOCK PULSES NECESSARY TO COMPLETE A TASK

FIELD OF THE INVENTION

This invention relates in general to processor utilization and, and in particular to processor utilization in portable electronic devices.

BACKGROUND OF THE INVENTION

Battery life is an important figure of merit of portable electronic devices which defines the frequency at which batteries need to be replaced. In addition to the economic impact of replacing the batteries, users associate this figure of merit with a degree of convenience. Hence, its desirable for the battery life of portable electronic devices to be optimized to provide the best utilization of the power available from a battery.

The great majority of portable electronic devices use a processor executing a predetermined sequence of instructions to perform various operations. Consequently, conventional portable electronic devices include a memory for storing the predetermined sequence of instructions and a microprocessor driven by a clock signal for executing the predetermined sequence of instructions. It has been established in the art that the current drain by the processor is proportional to processor utilization which in turn is proportional to the frequency of the clock signal. Hence, various methods of reducing current drain, thereby conserving power, have been developed. These methods reduce the current drain by manipulating the frequency of the clock signal in accordance with different modes of operation. A conventional method adopted in portable electronic devices that support multiple applications is to provide maximum processor utilization when one or more applications are active. This is accomplished by setting the frequency of the clock signal to a higher frequency. When none of the applications are active, the frequency of the clock signal is set to a lower frequency, thereby reducing the current drain of the processor. A disadvantage of this method is each of the multiple applications requires a different amount of processor utilization, but the clock signal, and hence the level of processor utilization, can only be set to either a higher or a lower level. Consequently, an application which requires a low level of processor utilization is provided with the high level of processor utilization, which results in inefficient use of power. For example, in a portable electronic device which supports a selective call receiver, which requires 10% processor utilization, and a hand writing recognition application, which requires 100% processor utilization, the processor is driven by the clock to provide 100% processor utilization for both applications resulting in inefficient use of limited battery power.

Hence, there is a need for a method and an apparatus for improving utilization of limited battery power in a portable electronic device, where the amount of resources provided to execute an application is in accordance with the amount of resources required to execute the application.

SUMMARY OF THE INVENTION

In carrying out the objects of the present invention in one form, there is provided a method for improving utilization of limited resources in a portable electronic device, wherein a processor is coupled to a plurality of programmable resource allocates (PRAs) which provide a programmable portion of each of a corresponding plurality of limited resources therefrom in accordance with resource utilization inputs (RUI), and wherein the processor utilizes the programmed portion of each of the plurality of limited resources from the plurality of PRAs to execute a task, the method comprising the steps of: retrieving RUIs and a task from a memory; programming the each of the plurality of PRAs in accordance with the RUIs; and the processor executing the task using only the programmed portions of the plurality of limited resources from the PRAs as defined by the RUIs.

DETAILED DESCRIPTION OF THE INVENTION

Figure 1:
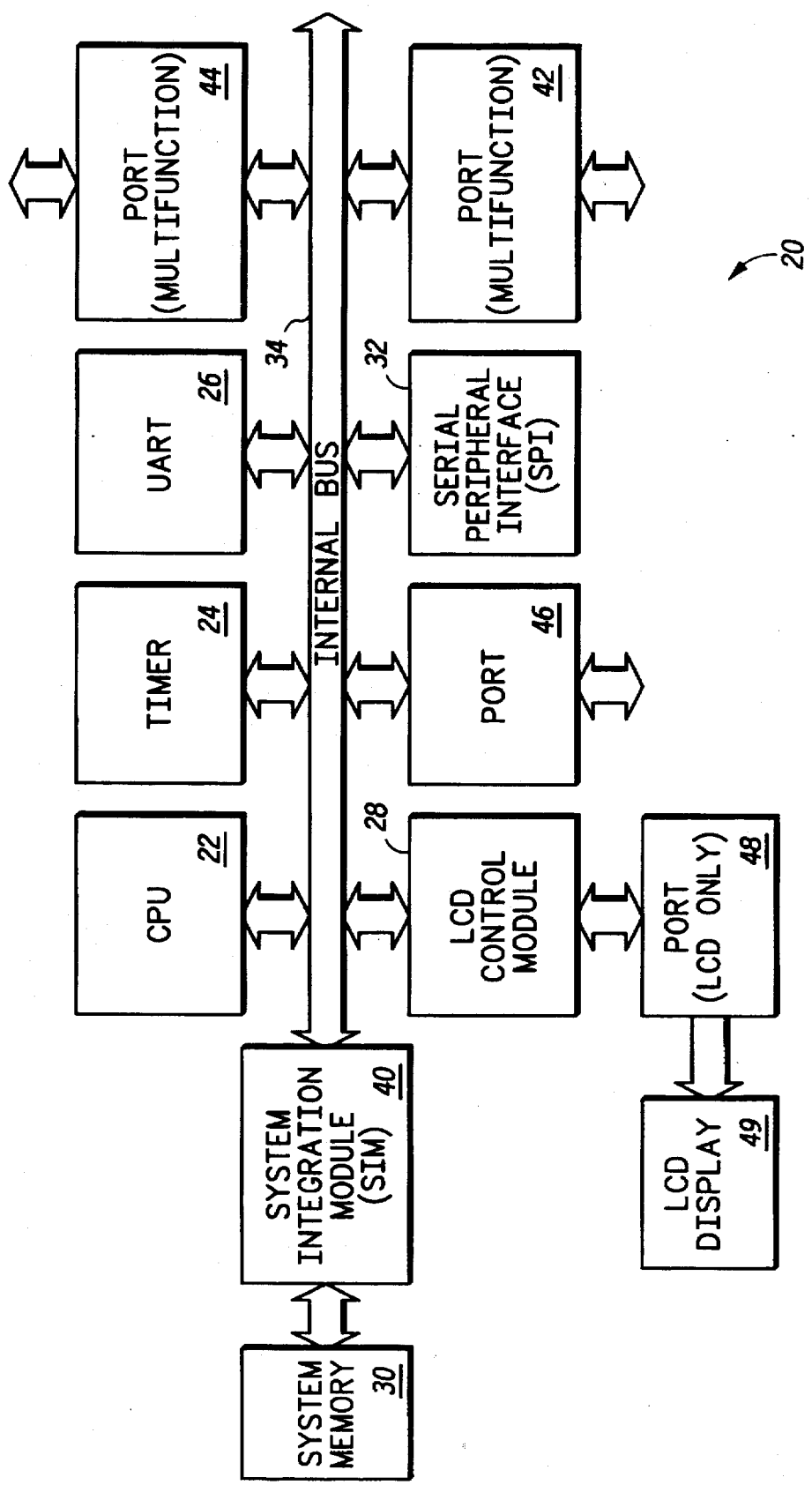
FIG. 1 illustrates a block diagram of a data processing system in a portable electronic device in accordance with a preferred embodiment of the present invention.

FIG. 1 illustrates a block diagram of a data processing system 20 in a portable electronic device in accordance with the present invention. Data processing system 20 includes central processing unit (CPU) 22, timer 24, universal asynchronous receiver/transmitter (UART) module 26, LCD control module 28, serial peripheral interface (SPI) 32, internal information bus circuit 34, system integration module (SIM) 40, and multi-function ports 42, and 44, and ports 46 and 48.

SIM 40 is connected to internal bus circuit 34 and can receive and transmit signals to data processing system 20 by way of internal bus circuit 34 or to circuits external to data processing system 20. System memory 30 is connected to data processing system 20 via SIM 40. In addition SIM 40 includes programmable resource allocators (PRAs) for providing programmable portions of resources to the CPU or processor 22. Multi-functional ports 42 and 44 can receive and transmit signals external to data processing system 20 and are connected to internal bus circuit 34. Ports 46 and 48 can receive and transmit signals external to data processing system 20 and are connected to internal bus circuit 34. Ports 42, 44, and 46 are multipurpose parallel bi-directional ports for transmitting and receiving signals external to S data processing system 20, such as keyboards, external memory, DSPs (digital signal processors), modems, and the like. Port 48 is for transmitting display data to the LCD display 49. Ports 42, 44, 46, and 48 may be coupled to integrated circuit pins, pads, or other types of terminals for transmitting and receiving signals external to data processing system 20. SIM 40 can receive and transmit signals to any of the other modules connected to internal bus circuit 34.

CPU 22 is connected to internal bus circuit 34 and may receive and transmit signals to each of the other modules connected to internal bus circuit 34. CPU 22 may optionally receive and transmit signals external to S data processing system 20 by way of SIM 40. The CPU is usually responsible for receiving, interpreting, and executing the software instructions used to control the data processing system. UART 26 is connected to internal bus circuit 43. UART 26 supports asynchronous serial communications with external devices such as modems and other data processing systems at standard baud rates. SPI 32 can receive and transmit signals external to data processing system 20 and with other modules via internal bus circuit 34. SPI 32 is a master/slave serial peripheral interface for communicating with external devices such as analog-to-digital converters, non-volatile memory devices, and other data processing systems. System memory 30 is bi-directionally connected to SIM 40. System memory 30 is a conventional memory unit comprising an array of static random access memory (RAM) cells and read only memory (ROM) cells organized in rows and columns. System memory 30 may be external to data processing system 20, or may be on the same integrated circuit as data processing system 20. In the illustrated embodiment, system memory 30 is an external memory unit. Timer 24 is connected to internal bus circuit 34, and communicates with other modules of data processing system 20 via internal bus circuit 34. LCD control module 28 is connected to internal bus circuit 34. LCD control module 28 provides control functions for refreshing an LCD display screen connected to port 48.

The embodiment of data processing system 20 which is shown in FIG. 1 illustrates one particular microprocessor within a family of microprocessors. Because microprocessors in the same family generally have a plurality of differing on-board peripherals, or modules, FIG. 1 illustrates only one embodiment of data processing system 20. Alternate embodiments of data processing system 20 may have fewer, more, or different on-board peripherals than those illustrated in FIG. 1.

Figure 2:
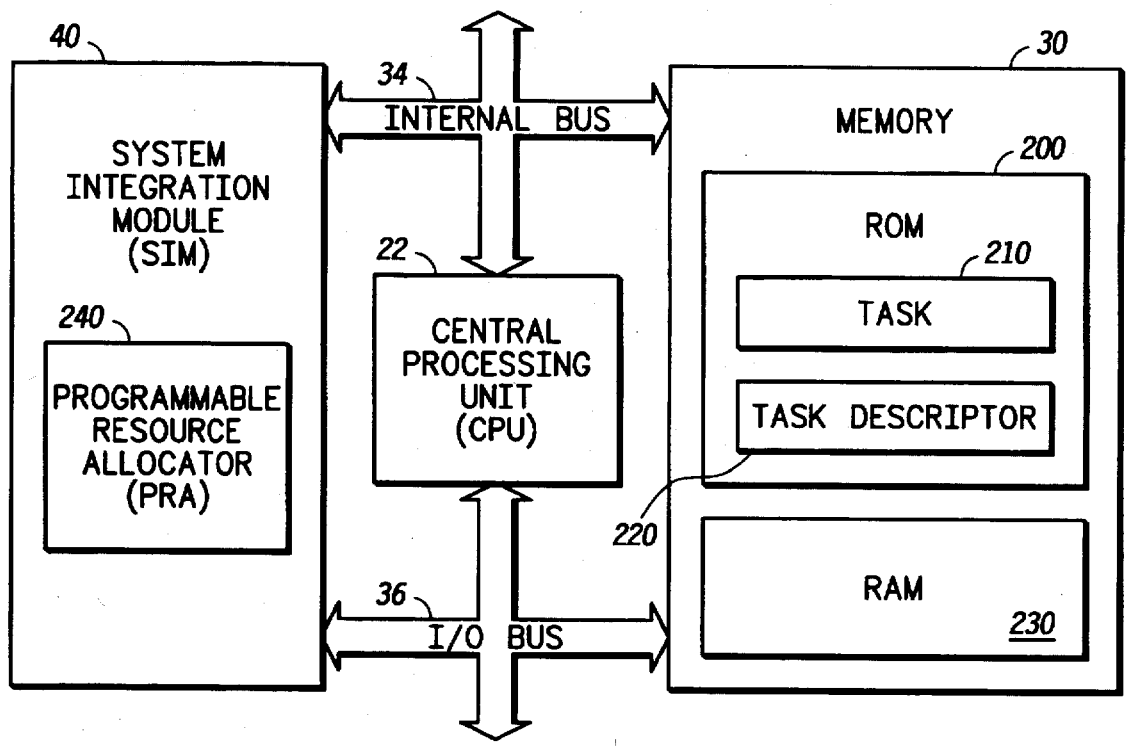
FIG. 2 illustrates a block diagram of a portion of the data processing system in FIG. 1 in accordance with the preferred embodiment of the present invention.
Figure 3:
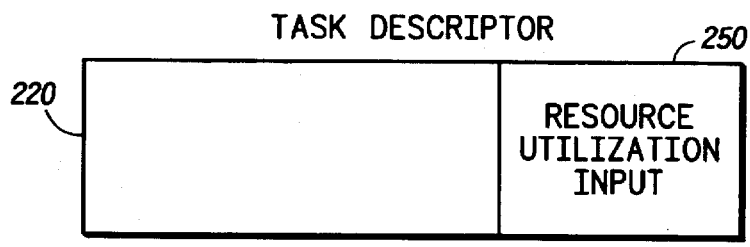
FIG. 3 illustrates a block diagram of the task descriptor of FIG. 2 in accordance with the preferred embodiment of the present invention.

FIG. 2 illustrates a portion of the data processing system 20 comprising the CPU or processor 22, the system memory 30 and the SIM 40. The processor 22 comprises a semiconductor microprocessor such as are well known in the art, and in the preferred embodiment the processor 22 is the Motorola 68000. The system memory 30 comprises a read-only-memory (ROM) 200 which stores a task 210 and a task descriptor 220, and a random access memory (RAM) 230 for use by the processor 22. In addition, the ROM 200 may also contain other information which need to be stored in a non-volatile memory. The task 210 comprises instructions which are retrieved, or read from the ROM 200 and run by the processor 22 in a predetermined sequence, thereby executing the task 210. The task descriptor 220 comprises information required to execute the task 210 and includes one or more resource utilization inputs (RUIs) 250, as illustrated in FIG. 3. The task descriptor 220 may include additional information, such as initialization settings for various software routines and hardware setting and the like, that are required to execute the task 210. The SIM 40 includes a programmable resource allocator (PRA) 240, which in the preferred embodiment comprises a power management unit (PMU). In another embodiment, the SIM can include other PRAs for controlling other resources, which the processor will need to execute the task 210. The PRA 240 is coupled to the processor 22 for receiving a RUI 250 from the processor 22, and in response providing a programmed portion of a resource to the processor 22 in accordance with the received RUI 250. When the PRA 240 is a PMU as in the preferred embodiment, the PRA 240 provides a predetermined number of clock pulses to the processor 22, in accordance with the received RUI 250. In addition the PRA 240 can periodically provide the predetermined number of clock pulses to the processor 22. The processor 22 uses the predetermined number of clock pulses to execute a task, and advantageously only draws a current when receiving the clock pulses, thereby conserving power.

Hence, with the present invention a processor is provided with only a predetermined number of clock pulses to execute a task, the processor advantageously drawing current only when the predetermined pulses are received. Prior art methods, where a processor is provided with a continuous sequence of clock pulses when executing the task irrespective of the requirements of the processor, results in lower processor utilization and higher current drain than the present invention.

Figure 4:
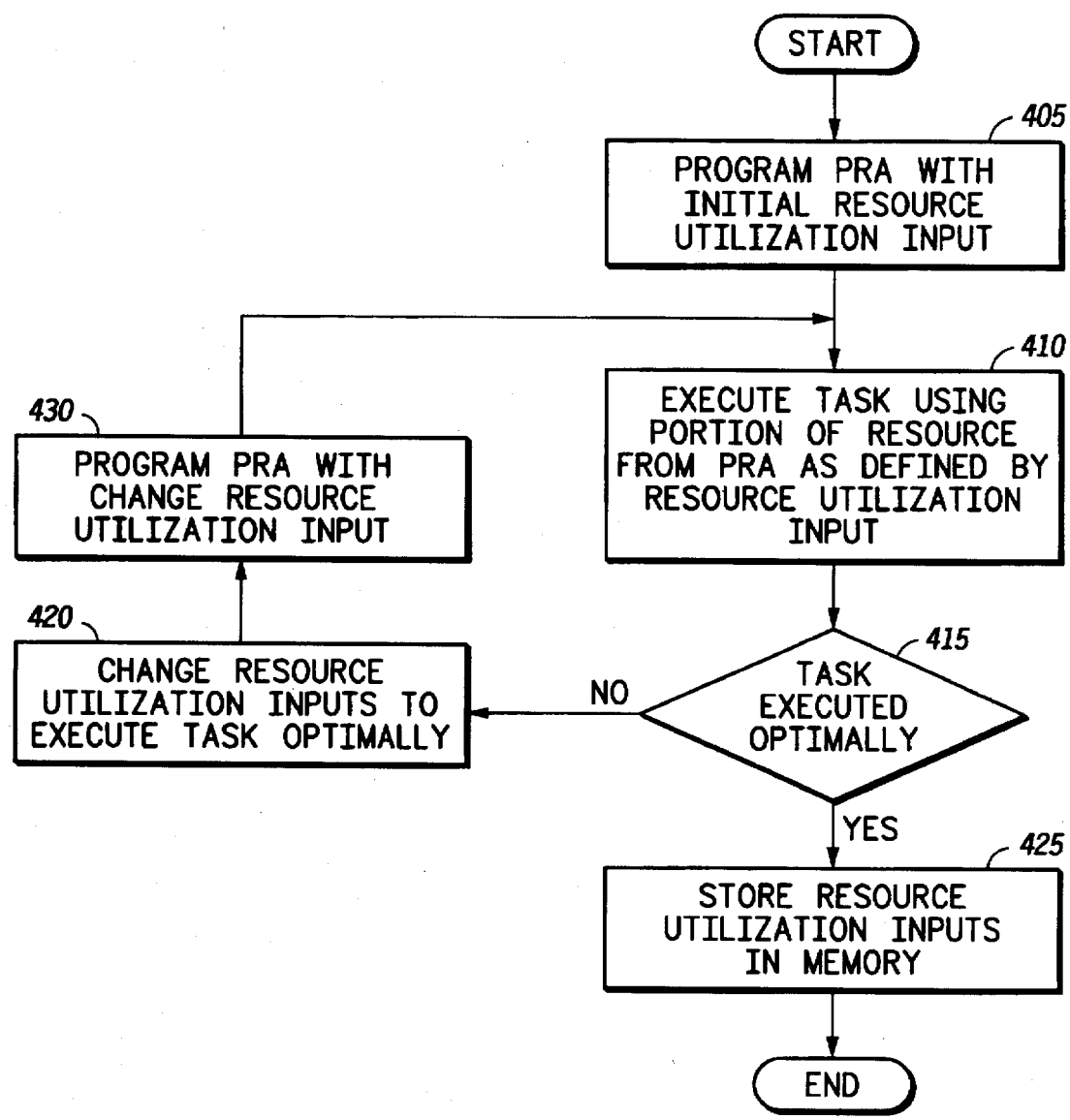
FIG. 4 illustrates a flowchart detailing the operation of the portion of the data processing system in FIG. 2 in accordance with the preferred embodiment of the present invention.

FIG. 4 illustrates a flowchart that details the steps for determining the resource required by a processor for executing the task 210 in accordance with the preferred embodiment of the present invention. Processing begins with programming 405 the PRA 240 with an initial RUI 250. Subsequently, the processor executes 410 the task 210 using the portion of the resource from the PRA 240 programmed with the initial RUI 250. When a determination 415 is made that the task 210 is executed optimally using the portion of the resource from the PRA 240 programmed with the initial RUI, then the initial RUI is stored in the task descriptor 220 in the ROM 200. Alternatively, when the determination 415 indicates that the task 210 is not executed optimally, then the initial RUI is changed 420 to optimize the execution of the task 210, and the task 210 is executed 410 using the portion of the resource from the PRA 240 programmed 430 with the changed RUI. The determination 415 is then repeated, and when the determination 415 indicates that the task 210 is executed optimally, the changed RUI 250 is stored in the task descriptor 220 in the ROM 200. Alternatively several iterations of changing 240 the RUI 250, programming 430 the PRA 240 with the changed RUI, executing 410 the task 210 using the changed RUI, and determining whether the task 210 is executed optimally, may be necessary to determine the RUI 250 that is to be stored in the task descriptor 220 in the ROM 200.

Figure 5:
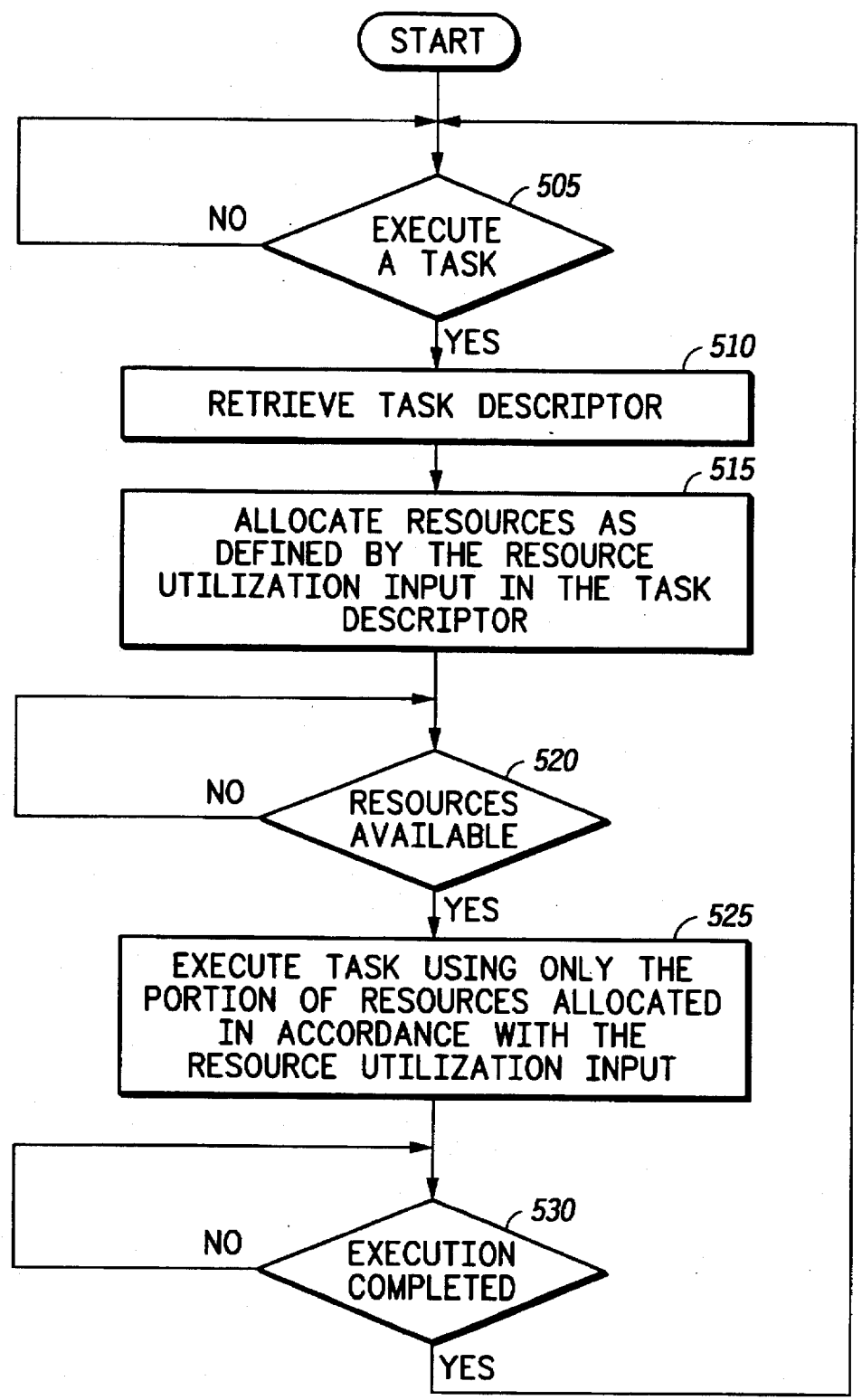
FIG. 5 illustrates a flowchart further detailing the operation of the portion of the data processing system in FIG. 2 in accordance with the preferred embodiment of the present invention.

FIG. 5 illustrates a flow chart which details the operation of the preferred embodiment of the present invention. Processing begins with the processor 22 determining whether a task 210 is to be executed 505. When a task 210 is to be executed 505, the processor 22 retrieves 510 the task descriptor 220 from the ROM 200 in the system memory 30. In the preferred embodiment the processor 22 is event driven, which means that the processor 22 executes tasks when an event occurs which requires a particular task to be executed. Hence, an event occurs which requires the processor 22 to execute the task 210. As illustrated in FIG. 4, the resource requirement for the task 210 is predetermined and, accordingly, the RUI 250 is defined and stored in the task descriptor 220 in the ROM 200. Hence, for each task that is executed by the processor 22 a corresponding task descriptor which includes a RUI is stored in the ROM 200. The task descriptor 220 may include one or more RUI 250 dependent upon the resources required to execute a corresponding task. The processor 22 then allocates 515 resources as defined by the RUI 250. In the preferred embodiment, after retrieving the task 210 and the ask descriptor 220, the processor 22 allocates resources by programming the PRA 240 with the retrieved RUI 250. Subsequently, when resources are available 520 the processor executes 525 the task 210 advantageously using only the resources provided from the programmed PRA 240. When resources are not available, the processor 22 waits until resources become available before executing 525 the task 210. Finally a determination is made whether the execution of the task is completed. When the execution 525 of the task 210 is complete, the processor 22 returns to determine 505 whether another task is to be executed. However, when the execution 525 of the task 210 is not complete 530, the processor 22 waits until the execution is complete 530 before returning to determine 505 whether another task is to be executed.

In accordance with the present invention, a predetermined RUI in a task descriptor of a corresponding task causes a PMU to provide a predetermined number of clock pulses to a processor when executing the task, which reduces current drain of the processor and consequently improves battery savings. This is achieved by providing the processor with only the predetermined number of clock pulses to execute the task. Thus, by providing the processor with only the predetermined number of pulses, a fewer number of pulses are provided to the processor than in the prior art. As the current drain of the processor is proportional to the number of clock pulses, the present invention advantageously reduces current drain of the processor.

Hence, this invention provides a method and apparatus for improving utilization of limited battery power in a portable electronic device, where the amount of resources provided to execute an application is in accordance with the amount of resources required to execute the application.

What is claimed is:

1. A method for improving utilization of a processor in a data processing system of a portable electronic device, wherein the processor is utilized only when clock pulses are received, the method comprising the steps of:
   a) determining the number of clock pulses for the processor to execute a task; and
   b) thereafter, when executing the task, transmitting only the number of clock pulses determined in step (a) to the processor, thereby utilizing the processor only when executing the task.

2. The method of claim 1, wherein a number of clock pulses are periodically received by the processor, and wherein the number of clock pulses define the degree of utilization of the processor, and wherein step (a) comprises the steps of:
   a1) determining the number of clock pulses that are periodically required by the processor to execute the task; and
   a2) determining the degree of utilization of the processor using the number of clock pulses determined in step (a1), and wherein step (b) comprises the step of:
   b1) thereafter, when executing the task, periodically transmitting only the number of clock pulses determined in step (a1) to the processor, thereby limiting the degree of utilization of the processor to the degree of utilization of the processor determined in step (a2).

3. The method of claim 1 after step (a) comprises the step of determining a resource utilization input (RUI) to a programmable resource allocator (PRA) to provide the number of clock pulses therefrom.

4. The method of claim 3 after determining the RUI, comprises the steps of:
   storing the RUI; and
   retrieving the RUI prior to executing the task.

5. An apparatus for improving processor utilization, wherein each of a plurality of tasks require a predetermined degree of processor utilization for execution, and wherein the degree of processor utilization is determined by a predetermined number of clock pulses, and wherein current drain is proportional to the predetermined number of pulses, the apparatus comprising:
   a power management unit (PMU) for receiving a resource utilization input (RUI), and for providing a predetermined number of clock pulses in accordance with the received RUI;
   a memory for storing a first task descriptor and a first task, wherein the first task descriptor includes a first RUI for programming the PMU to provide a first predetermined number of pulses for executing the first task, and the memory for storing a second task descriptor and a second task, wherein the second task descriptor includes a second RUI for programming the PMU to provide a second predetermined number of pulses for executing the second task; and
   a processor coupled to the PMU and the memory for retrieving the first task and the first task descriptor from the memory, for programming the PMU with the first RUI included in the retrieved first task descriptor prior to executing the first task, and for executing the first task when receiving the first predetermined number of pulses, thereby executing the first task at a first degree of processor utilization and drawing a first level of current drain,
and for retrieving the second task and the second task descriptor from the memory, for programming the PMU with the second RUI included in the retrieved second task descriptor prior to executing the second task, and for executing the second task when receiving the second predetermined number of pulses, thereby executing the second task at a second degree of processor utilization and drawing a second level of current drain.

6. The apparatus in claim 5 wherein the PMU, the memory and the processor are integrated on a semiconductor chip.

7. The apparatus in claim 6 wherein the semiconductor chip is substantially similar to the Motorola 68328 integrated circuit.

8. The apparatus in claim 5 wherein the memory comprises a nonvolatile semiconductor storage device.

9. The apparatus in claim 8 wherein the non-volatile semiconductor storage device comprises a read only memory.

10. A portable electronic device comprising:
   a power management unit (PMU) for receiving a resource utilization input (RUI), and for providing a predetermined number of clock pulses in accordance with the received RUI;
   a memory for storing a first task descriptor and a first task, wherein the first task descriptor includes a first RUI for programming the PMU to provide a first predetermined number of clock pulses therefrom for executing the first task, and the memory for storing a second task descriptor and a second task, wherein the second task descriptor includes a second RUI for programming the PMU to provide a second predetermined number of clock pulses therefrom for executing the second task; and
   a processor coupled to the PMU and the memory for retrieving the first task and the first task descriptor from the memory,
for programming the PMU with the first RUI included in the retrieved first task descriptor prior to executing the first task,
for receiving a first predetermined number of pulses from the programmed PMU, and for executing the first task when receiving the first predetermined number of clock pulses, the processor operating at a first degree of processor utilization and drawing a first level of current drain, and for retrieving the second task and the second task descriptor from the memory, for programming the PMU with the second RUI included in the retrieved second task descriptor prior to executing the second task, for receiving a second predetermined number of pulses from the programmed PMU, and for executing the second task when receiving the second predetermined number of clock pulses, the processor operating at a second degree of processor utilization and drawing a second level of current drain.

11. The portable electronic device of claim 10 wherein the PMU further comprises a PMU for periodically providing the predetermined number of clock pulses in accordance with the received RUI.

12. An apparatus for improved processor utilization, comprising:

a power management unit (PMU) for receiving a resource utilization input (RUI), and for providing a predetermined number of clock pulses in accordance with the received RUI;

a memory for storing a first task descriptor and a first task, wherein the first task descriptor includes a first RUI for programming the PMU to provide a first predetermined number of clock pulses for executing the first task; and a processor coupled to the PMU and the memory for retrieving the first task and the first task descriptor from the memory, for programming the PMU with the first RUI included in the retrieved first task descriptor prior to executing the first task, and for executing the first task at a first degree of processor utilization when receiving the first predetermined number of clock pulses, wherein the first degree of processor utilization is determined from the first predetermined number of clock pulses, and beginning execution at a second degree of processor utilization upon completion of the first task.

13. The apparatus of claim 12, wherein the memory is for storing a second task descriptor and a second task, wherein the second task descriptor includes a second RUI for programming the PMU to provide a second predetermined number of clock pulses for executing the second task; and wherein the processor is for retrieving the second task and the second task descriptor from the memory, for programming the PMU with the second RUI included in the retrieved second task descriptor prior to executing the second task, and for executing the second task at the second degree of processor utilization when receiving the second predetermined number of pulses.

14. A method for improving utilization of a processor in a data processing system of a portable electronic device, the method comprising the steps of:

(a) determining a first number of clock pulses for the processor to execute a first task;

(b) executing the first task in the processor at a first degree of processor utilization while transmitting the first number of clock pulses to the processor; and (c) after completion of the first task, ending execution in the processor at the first degree of processor utilization.

15. The method of claim 14, further comprising:

determining a second number of clock pulses for the processor to execute a second task; and after step (c), executing the second task in the processor at a second degree of processor utilization while transmitting the second number of clock pulses to the processor.

16. The method of claim 14, wherein a number of clock pulses are periodically received by the processor, and wherein the number of clock pulses define the degree of utilization of the processor, and wherein step (a) comprises the steps of:

a1) determining the number of clock pulses that are periodically required by the processor to execute the first task; and a2) determining the degree of utilization of the processor using the first number of clock pulses, and wherein step (b) comprises the step of:

b1) when executing the first task, periodically transmitting only the number of clock pulses determined in step (a1) to the processor, thereby limiting the degree of utilization of the processor to the degree of utilization of the processor determined in step (a2).

* * * * *

UNITED STATES PATENT AND TRADEMARK OFFICE
CERTIFICATE OF CORRECTION

PATENT NO. : 5,680,626
DATED : October 21, 1997
INVENTOR(S) : Michael C. K. Chu, Hing Leung Yiu It is certified that error appears in the above-indentified patent and that said Letters Patent is hereby corrected as shown below:

In Claim 10, Column 6, Line 54,
    after "of", change "dock" to --clock--.
In Claim 10, Column 6, Line 58,
    after "of", change "dock" to --clock--.
In Claim 10, Column 7, Line 2,
    after "of", change "dock" to --clock--.
In Claim 10, Column 7, Line 13,
    after "of", change "dock" to --clock--.
In Claim 11, Column 7, Line 18,
    after "of", change "dock" to --clock--.

Signed and Sealed this

Tenth Day of February, 1998

Attest:

BRUCE LEHMAN

*Attesting Officer*      *Commissioner of Patents and Trademarks*